United States Patent [19]
Smith

[11] Patent Number: 5,104,283
[45] Date of Patent: Apr. 14, 1992

[54] ORBITAL STACKER

[75] Inventor: Brenton L. Smith, Alexandria, Minn.

[73] Assignee: Brenton Engineering, Alexandria, Minn.

[21] Appl. No.: 534,721

[22] Filed: Jun. 7, 1990

[51] Int. Cl.$^5$ ............................................. B65G 57/03
[52] U.S. Cl. ................................. 414/798.6; 414/900
[58] Field of Search .............. 414/798.2, 798.3, 798.5, 414/798.6, 798.7, 900

[56]  References Cited

U.S. PATENT DOCUMENTS

| 2,706,053 | 4/1955 | Doller | 414/798.5 |
|---|---|---|---|
| 2,905,341 | 10/1959 | Anderson | 414/798.5 X |
| 3,409,148 | 11/1968 | Shields | 414/900 X |
| 3,445,980 | 5/1969 | Salomon | 414/798.5 X |
| 3,570,686 | 3/1971 | Moll | 414/798.5 |
| 3,924,758 | 12/1975 | Gram | 414/798.6 |
| 4,162,870 | 7/1979 | Storm | 414/798.5 |
| 4,285,621 | 8/1981 | Spencer | 414/900 X |
| 4,669,600 | 6/1987 | Fluck | 414/798.5 X |
| 4,723,883 | 2/1988 | Smith | 414/798.2 X |
| 4,824,307 | 4/1989 | Johnson et al. | 414/798.2 |

OTHER PUBLICATIONS

Star Wheel Stacker.
Cross-Pusher Stacker.
Orbital Pusher.

Primary Examiner—Frank E. Werner
Assistant Examiner—Craig Slavin
Attorney, Agent, or Firm—Kinney & Lange

[57]  ABSTRACT

This invention relates to a container stacker having at least one moving member attached to an endless flexible element. The moving member delivers containers from a delivery device to a container receiving surface and moves the containers across the container receiving surface.

22 Claims, 3 Drawing Sheets

ORBITAL STACKER

BACKGROUND OF THE INVENTION

The present invention relates to devices which stack containers. In particular, it relates to devices which stack a plurality of containers or products which are self-contained, and which are capable of being continuously delivered.

Many products such as food, automobile parts, books, tools, video cassettes, and health care products, for example are packaged in substantially cubical (often rectangular) containers before being stored and shipped to wholesalers and retailers. Because such products are produced in large volume, it is desirable to handle them in bulk—as by stacking or otherwise arranging them in larger containers or cases.

There are three basic types of automated devices, commonly referred to as container stackers, known which are used to stack containers. One known automated stacker is referred to in the art as a cross-pusher. In these devices, containers are fed vertically downward through a chute in a single row onto a substantially horizontal container receiving surface. A substantially vertical plate (cross-pusher) contacts one or more of the fed containers and pushes them in a horizontal path toward a second plate. The second plate is also substantially vertical and perpendicular to the container receiving surface. A pneumatic cylinder attached to the second plate places pressure on each container being stacked. The force is delivered in a direction opposite the direction of movement of the containers.

A pneumatic cylinder moves the first plate and cross-pusher along the container receiving surface (retracting after each container) until the engaged containers contact either the second plate or another container. After a selected number of containers have been pushed across the container receiving surface, the cross-pusher retracts leaving a formed block of containers.

Cross-pusher stackers are compact, and are relatively simple in design. However, the stacker does not maintain enough control of the containers to operate at high speeds—exceeding 200 containers per minute, for example. For example, the containers stacked above the container receiving surface (on another container) are unstable and are known to fall out of the desired alignment, causing the entire stacking line to become jammed. The use of a cross-pusher type case stacker in some applications is known to cause production delays due to jamming.

Even if groups of containers are stacked into a single layer of containers, as the first plate withdraws to allow the next container fall, containers tend to fall in a direction opposite the direction of horizontal travel and jam the case stacker. Further, a cross-pusher stacker is known to damage containers, because the containers drop in an uncontrolled fashion. The rough handling characteristics of such a stacker limit its use to products which are not fragile. It would be inappropriate for example to select such a stacker to stack containers of lasagna noodles because the uncontrolled fall would fracture the noodles.

Another known case stacker is a star wheel type stacker. A continuous stream of containers are fed horizontally onto a star shaped wheel. The containers are fed in a single stream. The wheel has a number of vees, each of which are shaped to receive one container. The containers are oriented in the feed stream to lie with the longest dimension being substantially horizontal and in the direction of flow, and the shortest dimension being substantially vertical. The width of the star wheel, including the width of each vee is selected to be substantially the same as the width of each container, as measured transverse to the direction of travel of the feed.

The horizontal feed stream passes through a pair of oppositely spaced pinch belts which uniformly deliver a continuous stream of containers to the wheel. The pinch belts are driven and this provides the power that drives the product to the star wheel. In most cases the wheel is simply turned by the force of the incoming products.

The feed rate is coordinated with the linear speed of the star wheel at the location of the vees. Each container comes into contact with a vee, the vee located along the outer edge of the rotating wheel. The vee is shaped such that as the wheel rotates, the containers become substantially vertically oriented, and are gently placed onto a horizontal container receiving surface.

After a selected quantity of containers are collected, the group is held together by a pair of vertical plates placed on opposite sides of the container receiving surface. The containers are then upstacked.

Although this type of stacker is suitable for higher speed lines, e.g.—exceeding 200 containers per minute, and provides for gentle product handling, it is more costly to produce and purchase, and requires a great deal of space for its operation. Maintenance costs are higher as the construction is more complex, as compared to the cross-pusher, and more downtime is necessary for repair. Another disadvantage of the star wheel design is that the design does not provide a means to apply tension to the containers while the containers are located in the vees. Loose containers become misaligned, and jam the line causing further downtime.

A third type of known device, often referred to as an orbital accumulator, includes a single substantially vertical push bar which is pivotally attached at an upper and lower point to upper and lower wheels. Both wheels are located on a substantially vertical axis in a vertical plane and are of substantially the same diameter. Both wheels are driven by a single motor, the motor driving a sprocket connected by a shaft to the lower wheel. The upper wheel is connected by a shaft to a driven sprocket. As the motor shaft rotates, the drive sprocket, driven sprocket and chain connecting the sprockets drive the upper and lower drive wheels in unison.

The vertical push bar is pivotally attached to a point on each wheel. The distances between the pivot pin on the wheel and the center of rotation are equal for both wheels. The pivot point locations are selected so that the push bar remains substantially vertical, while the apparatus is in operation. The upper surface of the push bar moves in a substantially circular path.

The upper surface of the push bar contacts a lower surface of the container being fed into the accumulator. The circular path pattern has certain disadvantages. Most importantly, the speed of the push bar has both a horizontal and vertical element during operation. When the front surface of the push bar contacts the container, the push bar slaps the container because there is a substantial horizontal speed component at the point of impact.

Another disadvantage of such an orbital accumulator is that the diameter of the wheels must be selected in order to achieve the proper amount of drop of the push bar. The upper surface must become flush with the container receiving surface, or drop even lower in order to allow the containers to slide horizontally. If it is desired to stack a box which is taller than it is wide, the amount of drop must be at least equal to the height of the box. Because the path of travel is fixed, the pusher advances the boxes the same horizontal distance, causing a large distance to form between the newly vertically dropped box and the newly advanced box. Allowing such a large distance to form causes boxes to become misaligned, and the stacking line can jam.

Although this type of device has the advantage of being compact, and inexpensive to produce, it is limited in both speed and flexibility. The horizontal travel is limited. It is not possible to obtain the necessary vertical reach to engage more than one product in a single stroke. Since the device is limited to pushing one container at a time, the capacity of the device is also limited. The geometry of the device is limited to use with small products, and the movement is harsh on the products.

SUMMARY OF THE INVENTION

The present invention is an orbital stacker which is compact, is capable of running at very high speeds, and can stack two or more layers of containers at a time. The stacker of the present invention includes at least one moving member which is attached to a flexible endless element and which is driven to travel in an orbital path. The shape and size of the path as well as the shape and size of the moving members are selected to correspond to the size of containers being stacked. The moving member of the present invention transfers the product to a container receiving surface at a controlled rate of speed. The moving member also contacts the container when the moving member is approaching zero velocity in the direction of motion along the container receiving surface, and smoothly accelerates the containers to the desired location. The present invention is capable of running at relatively high rates of speed, (up to 300 containers per minute) and at the same time handles the product in a gentle manner, avoiding product and/or container damage which is experienced with the prior art container accumulators and stackers.

The stacker of the present invention also includes a frame for supporting the container receiving surface, and a means for limiting the travel of the stacked containers.

DETAILED DESCRIPTION OF THE PREFERRED EMBODIMENT

Figure 1:
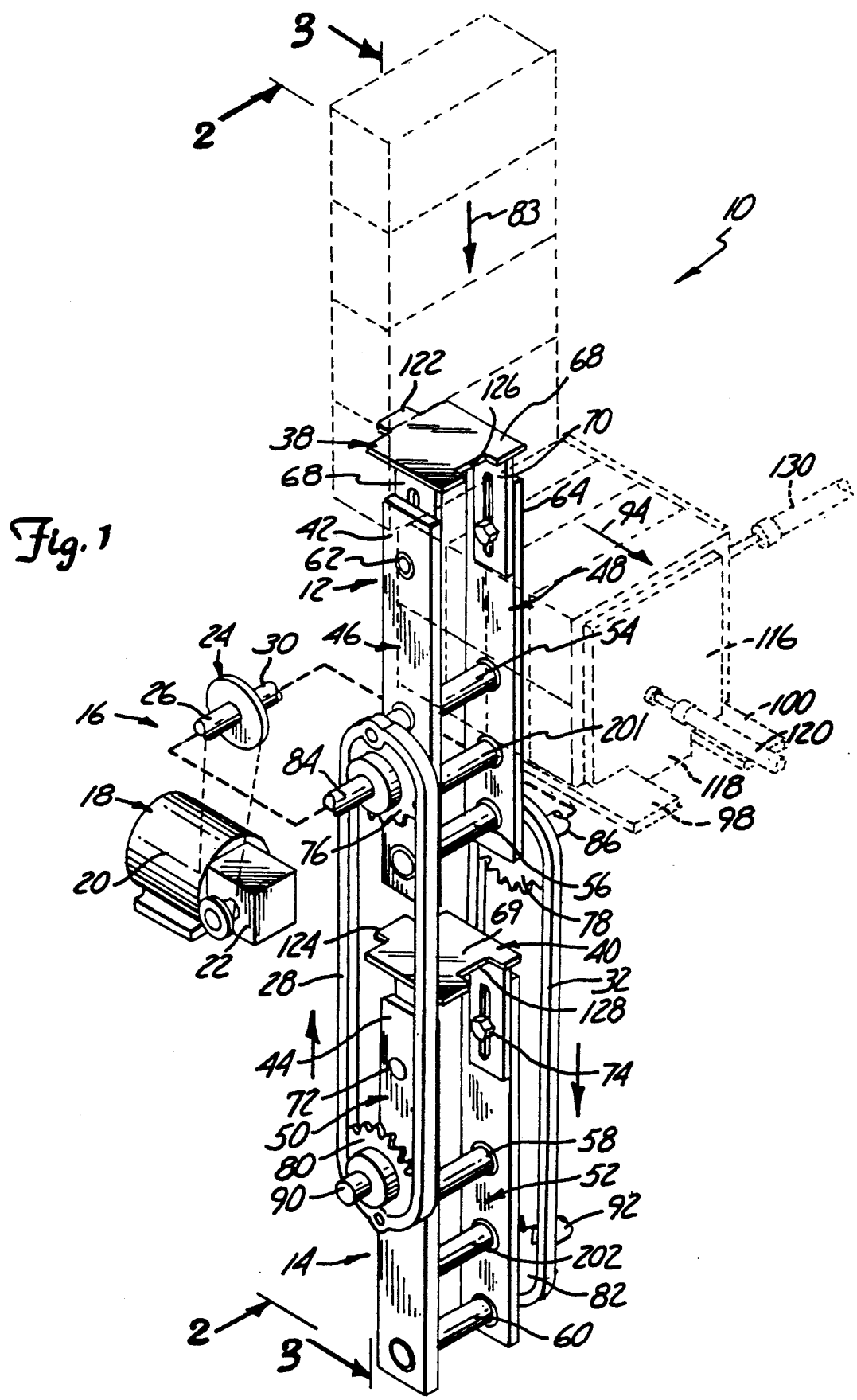
FIG. 1 is a perspective view of an orbital stacker in accordance with the present invention.

The present invention is a device for stacking containers such as cartons. A "container" for purposes of this disclosure is any semi-rigid package capable of being stacked by mechanical equipment. Paper containers, plastic containers for holding liquids, rigid products which are sold without additional packaging such as video cassettes, and flexible packages containing semi-rigid products such as plastic bags of diapers are examples of "containers". The device has at least one moving member which delivers containers from a delivery means at a controlled rate of speed to a container receiving surface. The moving member also moves the container along the container receiving surface. The present invention also includes means for limiting the travel of the containers on the container receiving surface. The travel limiting means also applies pressure to the containers in a direction opposite the direction of travel of the containers as the containers are being stacked.

The orbital stacker of the present invention advantageously runs at speeds of up to 300 containers per minute. The most preferred range of speed is between about 200 to about 300 containers per minute, although the device is capable of running at much lower speeds, and even higher speeds.

The orbital stacker of the present invention is capable of being adjusted to stack containers of varying heights, and stack one or more layers of containers at a time. Unlike the third prior art accumulator discussed above, the device may be used on containers which are taller than they are wide. In addition, because the device is capable of stacking several layers of containers at one time, the components of the stacker may be selected to stack large volumes of containers per minute.

Aside from being capable of running at relatively fast speeds, the stacker of the present invention transfers containers from a delivery means to a container receiving surface at a controlled rate of speed which is slow enough to protect the packaged goods or the containers themselves from damage. What is meant by a "controlled rate of speed" for purposes of this disclosure is speed which is not constant in the direction of travel of the containers being delivered to the container receiving surface, but rather a speed which accelerates and decelerates in response to the movement of the flexible endless element along an orbital path. The containers are not permitted to fall freely or drop; they are lowered. The orbital stacker of the present invention also gently moves the containers along the container receiving surface. As the moving member comes into contact with the container, the speed and acceleration of the moving member in that direction is approximately zero. The moving member and container accelerate together avoiding container damage.

"Orbital path" for purposes of this disclosure is a path which is substantially circular at two opposite ends, each end being connected to the opposite end with a substantially straight, elongated portion.

The orbital stacker of the present invention is compact, and requires very little floor space for operation. The compact design allows for more efficient use of production facility space.

An orbital stacker of the present invention is illustrated in perspective in FIG. 1. The most preferred orbital stacker 10 includes a pair of moving members 12 and 14. The orbital stacker 10 also includes a drive component 16. The drive component 16 of the preferred embodiment includes a gearmotor 18 having a motor 20 and gear reducer 22 for driving a double ended intermediate shaft 24. The gearmotor is a Hub City gearmotor, model 184-A having a 15:1 gear ratio, having a ½ horsepower motor, and a 56C face mount connection.

The intermediate shaft 24 has a first portion 26 for driving a first endless element which in the preferred embodiment is a first chain 28 and a second portion 30 for driving a second endless element which in the preferred embodiment is a second chain 32. Although both the first and second chains 28 and 32 are driven by the double ended intermediate shaft 24, the present invention also contemplates that the gearmotor 18 drive directly or indirectly only one or the other chains 28 or 32.

The first and second chains 28 and 32 in the preferred embodiment are formed from standard #50 roller chain which is available from any industrial supplier. Chain guides (not shown) are needed to stabilize chains 28 and 32 and are available from Nolu Plastics, Inc., of 3 Crozerville Road, Rolling Hills Industrial Center, Aston, Pa., 19014. The chain guides can be obtained by ordering chain guide part number GR-300-50. A chain is preferred over a belt because the chains may be pivotally mounted onto the first and second moving members 12 and 14 by a first set of pivot pins 54 and 56. At one end of each pivot pin 54 and 56 is a #50 chain connector link, which in the preferred embodiment is welded on. As the chains rotate, the pivot pins 54 and 56 remain in fixed relation to the chain. Apertures (not shown) are counter-bored into the inner surfaces of the aluminum sections of aluminum 46, 48 to receive bearings (not shown). The pins 54 and 56 are positioned in the bearings are free to move when the moving member 12 is in motion. Pivot pins 58 and 60 are identical to pivot pins 54 and 56, and function in an identical manner.

Both moving members 12 and 14 in the preferred embodiment are substantially vertical, elongated members, each being adjustable in height. Adjustable extensions 38 and 40 are mounted onto the upper ends 42 and 44 of the moving members 12 and 14.

The moving members are constructed of two sections of aluminum rectangular bar stock 46, 48, 50 and 52, each having a ½ inch thickness and an 1½ inch width, each section being cut to a 12¾ inch length. Although the precise dimensions of the moving members are not important, the above mentioned dimensions are suitable for use with containers having a wide variety of widths and heights. The material of construction is also not important.

The first moving member 12 has one pusher arm spacer 201 which separates aluminum sections 46 and 48. In the preferred embodiment the pusher arm spacer 201 is constructed of ½ inch aluminum round stock, and has threaded aperatures at each end for receiving a bolt. The outer surfaces of sections 46 and 48 are countersunk for receiving a bolt which secures the spacer 54 to the aluminum sections 46 and 48. Similarly, the second moving member 14 has one arm spacer 202 which separates aluminum sections 50 and 52. The spacer 202 is substantially identical in construction and assembly to spacer 201. The spacer 201 in moving member 12 in combination with the adjustable extension 38 together hold aluminum sections 46 and 48 rigidly together. Spacer 202 and extension 40 together hold aluminum sections 50 and 52 rigidly together. Pivot pins 54, 56, 58, and 60 however, are free to rotate.

The aluminum sections 46, 48, each have countersunk apertures (not shown) for receiving nut and bolt assemblies 62 and 64 for holding the adjustable extension 38 in place. The nuts are located on the inner surface, while the heads of the bolts are flush with the outer surfaces. The adjustable extension 38 has a substantially flat horizontal upper plate 66, and two slotted, spaced vertical legs 68 and 70, the outer surfaces which contact the inner surfaces of aluminum sections 46 and 48.

The aluminum sections 50 and 52 of moving member 14 also have countersunk apertures for receiving nut and bolt assemblies 72 and 74, which in a like manner hold adjustable extension 40 into place.

The adjustable extension 40 has an upper plate 69 which is substantially identical to plate 66. Each of the plates has a length as measured in the direction of travel of the moving members being stacked which is longer than the 1½ inch width of the aluminum sections 46, 48, 50 and 52 as measured in the same direction.

Figure 2:
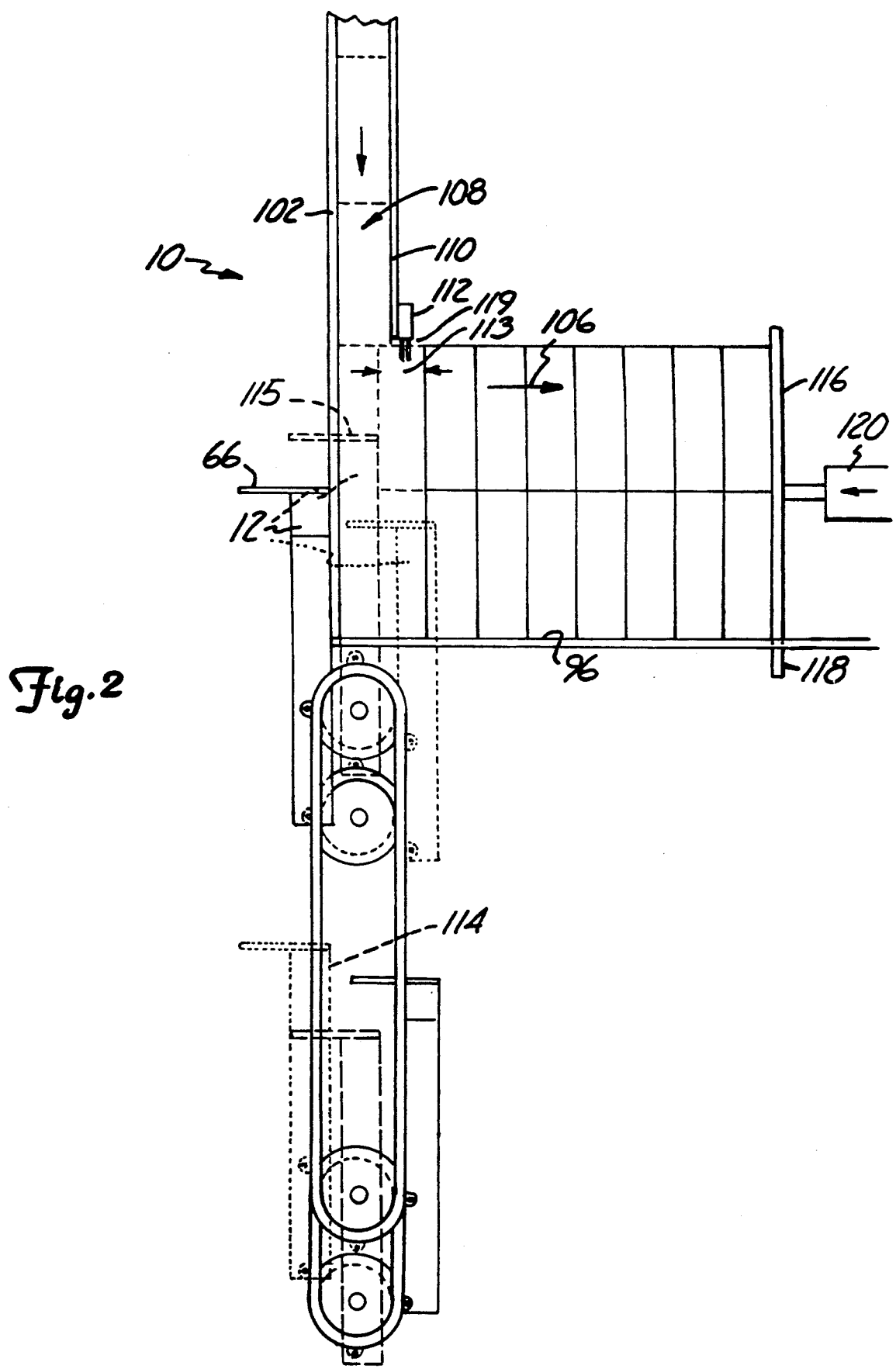
FIG. 2 is a partial schematic side elevational view of the orbital stacker of FIG. 1.

A critical aspect of the present invention is to select the upper plate length which is large enough to keep the containers in at least partial contact with the plate until the plate is flush with the container receiving surface 96 (shown in FIG. 2). Typically this length is 120-130% of the width of the container. In the preferred embodiment, a plate having a 3 inch length is used to move 2 inch wide containers.

In operation, the gearmotor 18 causes the intermediate shaft 24 to rotate, which in turn causes two drive sprockets 76 and 78 to drive the chains 28 and 32 to move at a fixed linear speed. The moving member 12 remains substantially vertical due to the placement of pivot pin 54 on the first section of aluminum 46 and on the first chain 28, and a second pivot pin 56 on the second section of aluminum 48 and on the second chain 32. The moving member 14 also remains substantially vertical because the pivot pin placement is substantially identical to the placement in the first moving member 12. In the preferred embodiment, the spacing between pivot pins is about 3 inches.

During operation, each moving member 12 and 14 moves along an orbital path created by two drive sprockets 76 and 78, and two driven sprockets 80 and 82. Each sprocket 76, 78, 80 and 82 in the preferred embodiment has 18 teeth, and has an effective pitch diameter of 3½ inches. It is critical to the present invention to use substantially the same sized upper sprockets 76 and 78, and use the same size lower sprockets 80 and 82. However, it is not necessary that the upper and lower sprockets be of the same size. Because the motion is mostly vertical, there is minimal horizontal speed in the moving members 12 and 14 when portions of the moving members facing the containers resting on the container receiving surface make contact and begin to move horizontally. This feature assures smooth operation, and minimizes container damage.

The drive sprockets 76 and 78 are each welded onto shafts 84 and 86 which extend through the frame 88 (shown in FIG. 3) and which are driven by the intermediate shaft 24. Driven sprockets 80 and 82 are mounted onto shafts 90 and 92 which are mounted into bearings (not shown).

Each pair of sprockets in the preferred embodiment are centered along a substantially vertical axis, and are of the same outer diameter to achieve vertical travel of moving members 12 and 14. Although each of the sprockets in this example are of the same size, as mentioned above, it is only important that the two top sprockets 76 and 78 be of an identical size, and that the two bottom sprockets 80 and 82 be of the same size. The present invention is not limited to orbital pushers which move in a substantially vertical path. For example, the two bottom sprockets 80 and 82 could be of a different size than the upper sprockets, and the sprockets may be positioned to achieve vertical as well as horizontal travel on the upstroke, and have substantially vertical travel on the downstroke. The specific size of the sprockets 76, 78, 80, and 82 must be slightly larger than the width of the containers as measured in the direction as represented by arrow 94. Smaller sprockets would not provide sufficient clearance to allow containers to be lowered in the direction represented by arrow 83. The most preferred sprocket diameter is about 1.5 times the width of the container, as measured above. A cross sectional view of the stacker taken along line 2—2 in FIG. 1 is shown in FIG. 2. Attached to the frame 88 (shown in FIG. 3) is a container receiving surface 96 which is formed from two substantially flat, horizontal spaced apart rails 98 and 100 (Shown in FIG. 1). The rails 98 and 100 meet two substantially vertical angle portions 102 and 104 (shown in FIG. 3) which extend downwardly from above the moving members 12 and 14 to the container receiving surface 96. The most preferred rail orientation provides a ¼ inch space (horizontal) between the inner rail surface and the moving member 12 or 14 as the members come up to the back side of the containers. This running clearance insures that the rising moving member does not prematurely contact the containers being lowered by the moving member which is moving downward. The inner surfaces of the angle portions 102 and 104 prevent the containers from falling in a direction opposite the direction of movement of the stacked containers as represented by arrow 106.

A container delivery chute 108 is provided which delivers a plurality of containers vertically into the stacker 10. Angle portions 102 and 104 (shown in FIG. 3) define the rear corners, while angle portions 110 and another angle portion (not shown) define front corners. A horizontal brace 112 is provided to hold the angle portion 110 and the other angle portion (not shown) together in fixed relationship, preventing the containers from falling out of the path of the chute toward the stacked containers while the moving members 12 and 14 are in motion. The chute 108 is placed above the moving members 12 and 14 so that the distance between a container which has just come into contact with the surface 96 and another container just moved horizontally is approximately 1½ inches. This dimension is represented as dimension 113 in the Figure.

In operation, a moving member 12 at the highest point in the orbital path 115 (shown in phantom) reaches a height which is approximately equal to the height of the stacked containers. As the moving member moves past this position, the upper plate 66 moves downwardly and moves forward (in the direction shown by arrow 106). Although the moving member 12 moves forward as well as downward, the containers in the chute 108 drop straight downward at a controlled rate of speed. The speed in which the containers drop is equal to the vertical speed component of the moving member 12. After the moving member 12 drops between the horizontal rails 98 and 100 (shown in FIG. 1), the containers are lowered onto and rest upon the rails 98 and 100. The leading surface 114 of the second moving member 14 next contacts the newly deposited container at a point where the horizontal velocity component is about zero, and the containers are accelerated horizontally along the container receiving surface 96 consisting of the two rails 98 and 100. At the point of contact between surface 114 and the container, the member 14 begins to accelerate.

In order to prevent containers from falling out of alignment once they are stacked, a pressure plate 116 as shown in FIG. 1 is provided which has a downwardly extending notch 118 which fits in the space between the horizontal rails 98 and 100. A pneumatic cylinder 120 is actuated which moves the plate toward the moving members. The air pressure is then relieved. A minimal amount of force remains applied in a direction opposite the direction represented by arrow 94, and prevents containers from falling off of the rails 98 and 100. The plate 116 also prevents the device from jamming. Another feature which helps retain alignment is a downwardly extending brush 119 as shown in FIG. 2 which prevents the trailing edge of the stacked containers from falling backward.

As mentioned previously, each extension 38 and 40 as shown in FIG. 1 has an upper plate 68 and 69 which is wide enough in the direction of travel of the stacked containers shown by arrow 94 so that as the moving member rotates forwardly and downwardly, the container maintains contact with a portion the surface of the plate. The rear of each plate is extended with a tongue 122, 124 to extend the length, while the fronts of each plate have grooves 126, 128 which allow the plates to pass closely together without the plates 68, 69 touching.

Figure 3:
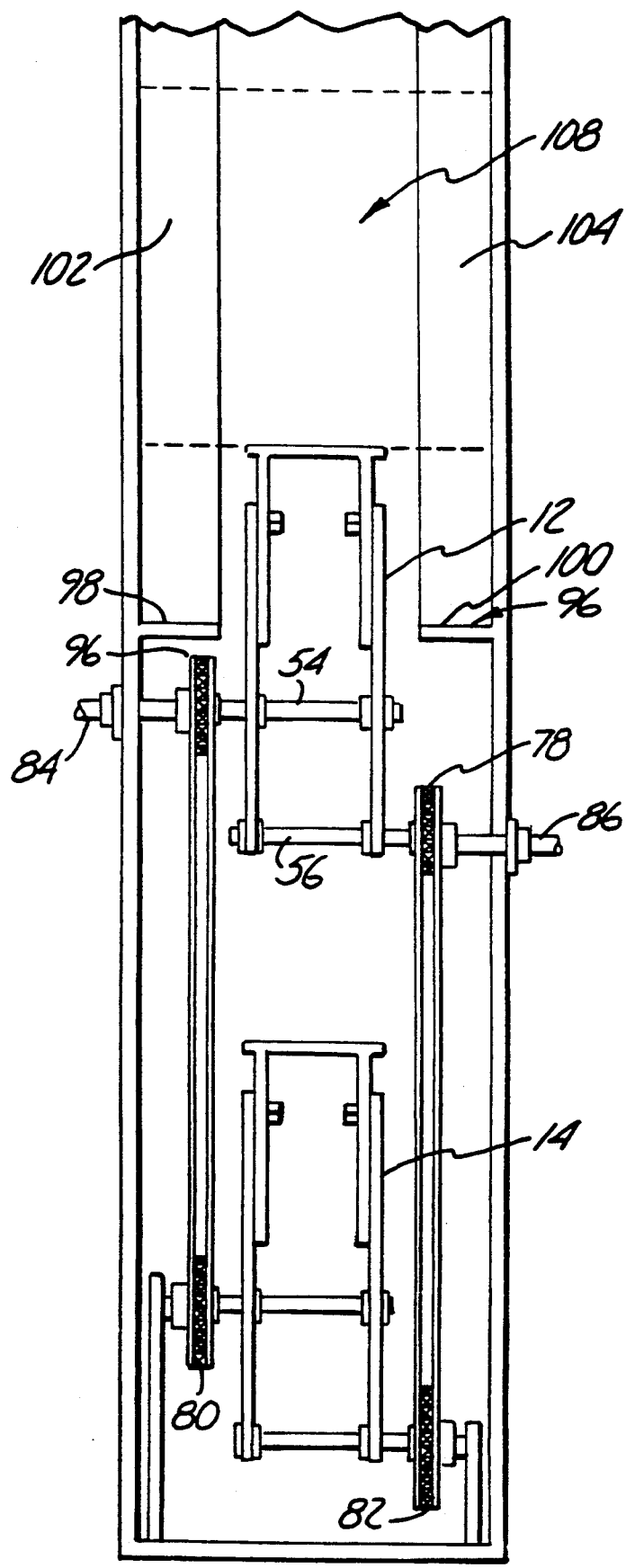
FIG. 3 is a partial cross-sectional, and partial cut-out view including the frame taken along line 3—3 in FIG. 1.

FIG. 3 is a partial cross-sectional view taken along line 3—3 as shown in FIG. 1. As can be seen in this Figure, each moving member 12 and 14 is narrow enough to pass between the two angled portions 102 and 104 of the delivery chute 108. The inner surfaces of the angled portions 102 and 104 are spaced apart to loosely surround the containers which are lowered to the rails 98 and 100.

Another feature of the preferred embodiment includes a mechanism for keeping enough tension on the chain (not shown) to prevent the chain from coming off the sprockets. In addition, a clutch is provided to disengage the moving members 12 and 14 when the desired number of containers have been stacked. A motion limiter and switch (not shown) is provided on the container receiving surface 96 which actuates the clutch. As shown in FIG. 1, a second pusher 130 is also provided to remove the formed stack of containers from the rails 98 and 100.

The moving member dimensions are selected based on the size of the container to be stacked, as well as the desired stacking capacity. The present invention is suitable for stacking more than one layer of containers at a time. Next, the sprocket and chain dimensions are selected to fix an orbital path which provides the desired clearance of ⅛ to ¼ inches between the surface of the container opposite the horizontal direction of flow and the leading surface 114 (shown in FIG. 2) when the horizontal component of velocity is approximately zero. The sprocket size is also selected to provide approximately 1½ inches for dimension 113 (shown in FIG. 2). The chain length and sprocket placements are selected to be large enough to allow the elongated moving members to freely rotate. In the preferred embodiment, the drive sprockets and driven sprockets are spaced apart about 18 inches.

Although the present invention has been described with reference to preferred embodiments, workers skilled in the art will recognize that changes may be made in form and detail without departing from the spirit and scope of the invention. For example, the entire working assembly could be mounted in many different positions.

What is claimed is:

1. A device for stacking container, comprising:

a support frame;
a motor mounted to the support frame;
a container receiving surface attached to the frame;
a delivery means for delivering a plurality of containers along a path in a first direction toward the container receiving surface;
at least one moving member for transferring the containers from the delivery means to the container receiving surface at a controlled rate of speed, and for moving the containers in a second direction along the container receiving surface, wherein the moving member has a substantially zero velocity component in the second direction when it contacts the container, thereby causing the container to smoothly accelerate in the second direction;
means for causing each moving member to travel in an orbital path, the means comprising at least one flexible endless element being driven by the motor, each flexible endless element being pivotally attached to the moving member; and
means for limiting the travel of the containers in the second direction.

2. The device of claim 1, wherein there are two moving members.

3. The device of claim 1, wherein there are two moving members and the means for causing the moving members to travel comprises first and second flexible endless elements, each flexible endless element being pivotally attached to each moving member at one point, wherein the spacing between the pivot points of each moving member is selected such that the moving members remain substantially vertical during rotation.

4. The device of claim 1 wherein the size and shape of a path of travel of each flexible endless element is selected such that when the moving member contacts the container to move the container in a second direction, the velocity component of the moving member in the second direction is about zero.

5. The device of claim 1, wherein the flexible endless element comprises a chain.

6. The device of claim 1 wherein the means for limiting the travel of the containers in a second direction comprises a pressure plate.

7. The device of claim 6 wherein the pressure plate has a container receiving face, the face being substantially perpendicular to the container receiving surface.

8. The device of claim 6 wherein the pressure plate is driven by a pneumatic cylinder.

9. The device of claim 1 wherein the means to cause the moving member to travel in an orbital path comprises a drive sprocket, and a driven sprocket.

10. The device of claim 9 wherein each drive sprocket is of substantially the same size, each driven sprocket is of substantially the same size, and each drive and driven sprocket has a diameter which is larger than a width of the container, as measured in the second direction.

11. The device of claim 9 wherein each moving member is of a height sufficient to deliver a container of a selected size to the container receiving surface, and each sprocket is selected to move each moving member in the second direction a distance equal to at least a width of the container, the width being measured in the second direction.

12. The device of claim 1 wherein each moving member has a first surface which contacts the containers while the containers are at least partially in contact with the delivery means, and the first surface is large enough in the second direction to remain at least partially in contact with a surface of the container until the container contacts the container receiving surface.

13. The device of claim 1 wherein each moving member has a second surface which contacts the containers, and moves the containers in the second direction.

14. The device of claim 9, wherein the spacing between the drive and driven sprockets is large enough to provide adequate clearance for rotational movement of the moving member.

15. The device of claim 1, wherein each moving member has a container receiving face substantially perpendicular to the container receiving surface, the container receiving face being of a size approximately equal to twice a dimension of a surface of the container which comes into contact with the container receiving face.

16. The device of claim 13 wherein the second surface of each moving member is of a size which is adjustable and which during travel remains substantially perpendicular to the container receiving surface.

17. The device of claim 1 and further comprising a clutch for disengaging the drive means when a sufficient number of containers have been stacked to form a grouping of a desired number of containers.

18. The device for stacking containers, comprising:
a support frame;
a motor mounted to the support frame;
a container receiving surface attached to the frame;
a delivery means for causing a plurality of containers to move along a path toward the container receiving surface and in a first direction;
at least two moving members which deliver the containers in the first direction from the delivery means to the container receiving surface and move the containers across the container receiving surface in a second direction, whereby the moving members have a substantially zero velocity component in the second direction when they contact the containers, thereby causing the containers to be smoothly accelerated in the second direction;
first and second endless elements driven by the motor, the first endless element operable in a first plane, the second endless element operable in a second plane, the first and second planes being spaced and being positioned on opposite sides of each moving member;
a first pivot means for pivotally attaching each moving member to a respective point on the first endless element; and
a second pivot means for pivotally attaching each moving member to a respective point on the second endless element.

19. The device of claim 18, wherein the planes are substantially parallel.

20. The device of claim 1 wherein the moving member comprises an elongated portion, and a top portion, the top portion including a substantially flat plate, the plate having a length measured in the second direction which is larger than a width of the container, the width of the container also being measured in the second direction.

21. The device of claim 20 wherein the length of the flat plate is at least 20% longer than the width of the container.

22. The device of claim 1 wherein the means for causing each moving member to travel comprises a drive sprocket and a driven sprocket and a flexible endless element, each flexible endless element contacting the drive and driven sprockets and each sprocket being of a diameter which is larger than a width of the containers, the width being measured in the second direction.

* * * * *

UNITED STATES PATENT AND TRADEMARK OFFICE
CERTIFICATE OF CORRECTION

PATENT NO. : 5,104,283
DATED : April 14, 1992
INVENTOR(S) : BRENTON L. SMITH

It is certified that error appears in the above-identified patent and that said Letters Patent is hereby corrected as shown below:

Col. 8, line 68, delete "container" insert "containers"

Col. 10, line 23, delete "The", insert "A"

Signed and Sealed this

Fifteenth Day of June, 1993

Attest:

MICHAEL K. KIRK

Attesting Officer    Acting Commissioner of Patents and Trademarks